United States Patent [19]

Philipps

[11] Patent Number: 5,567,364
[45] Date of Patent: Oct. 22, 1996

[54] AMALGAMATION OF POLYMER MATERIALS

[75] Inventor: Thomas E. Philipps, Granville, Ohio

[73] Assignee: Isorea, Inc., Granville, Ohio

[21] Appl. No.: 475,564

[22] Filed: Jun. 7, 1995

[51] Int. Cl.⁶ .......................... B29C 45/00; B29C 47/00
[52] U.S. Cl. .................. 264/140; 264/211; 264/328.1; 264/DIG. 69; 524/68
[58] Field of Search .................................. 264/140, 141, 264/211, 328.1, 328.17, DIG. 69; 524/68

[56] References Cited

U.S. PATENT DOCUMENTS 5,312,573  5/1994  Rosenbaum et al. ..................... 264/37
5,468,431  11/1995  Helling ..................... 264/37

*Primary Examiner*—Mary Lynn Theisen
*Attorney, Agent, or Firm*—Charles F. Schroeder

[57] ABSTRACT

A method of producing formable material of dissimilar polymers and the amalgamated product produced thereby in which mixed thermoplastic polymers have a small percentage of blown asphalt combined therewith, the asphalt acting somewhat as a flux to promote commingling and amalgamation of the polymers during processing to form a product as in extrusion and injection molding operations.

17 Claims, No Drawings

AMALGAMATION OF POLYMER MATERIALS

FIELD OF THE INVENTION

This invention is directed to the commingling or combination of polymer materials. Many dissimilar polymers in melted condition do not intermix. In many instances it has been found desirable to commingle polymers to produce an amalgamation which has properties useful and more advantageous than the component polymers themselves have. This is particularly true when waste polymer materials can be desirably utilized in combination or by combination with other polymers to produce materials which are extrudable, injection moldable, blow moldable, cast, or which can be calendared to form useful products of the combination. It has been found according to the invention that by adding a small amount of asphaltic material, compatibility of such dissimilar polymers can be achieved. Such asphaltic material additive acts in a sense as a flux for synthetic thermoplastic resins.

The term "blown asphalt" as utilized herein is asphalt in a hard, friable solid condition obtained by blowing air at high temperature through mineral residual oils of a refinery. Such asphalts also are known as oxidized asphalts, condensed asphalts, and mineral rubber. As used in the present invention such blown asphalts are ground into particles such as granules or powder and used in combination with dissimilar polymers to effect an amalgamation of the combination. The blown asphalt utilized herein has a softening point in the order of 305–315 degrees F. and the flash point of the asphalt is in the order of 600 degrees F.

BRIEF SUMMARY OF THE INVENTION

A number of dissimilar polymers or plastics which will not mix or commingle have been found readily adaptable to amalgamization by the addition of a small amount of blown asphalt. That is, by heating and softening and melting such polymers and adding a granular or powdered form of such asphalt, numerous tests have shown that the polymers will flow together readily to produce a new base material which can be utilized for a number of purposes other than is possible with the originally introduced polymers. In a sense the asphalt is a compatibilizer sometimes referred to as a mineral rubber material is obtained by blowing oxygen through hot asphalt, then cooling it to a solid state in which condition it is then ground into fine powder or granules and then bagged. The dissimilar polymers to be combined can be waste plastics. One-half to 10 percent by weight of the dissimilar polymers can produce a base material of different properties dependent upon the polymer materials with which the asphaltic compatibilizer is to be commingled. The addition of asphalt causes the resulting product to acquire a characteristic black color. In another sense the compatibilizer acts like a solvent in that it causes the dissimilar plastics, which in many cases would not otherwise commingle, to intermix and form an amalgamized combination.

With too much asphalt in the mixture the resulting product becomes brittle and subject to breakage. With too little of such asphalt, the combination is not as well integrated to provide a stable product. Process difficulties also result, such as extrusion difficulties which result in products having holes and tears in their matrix.

By way of example of the capability of the invention to effect an amalgamation of polymers, 75% of polyethylene and 25% polystyrene which otherwise would not readily combine, when intermixed with in the order of 6% by weight of asphalt granules and heating the combination to a flowing condition causes a uniform amalgamation of the dissimilar polymers. The polymers have a melting or softening temperature most generally under 200 degrees F. and the higher temperature asphalt would not ordinarily be expected to combine therewith at such temperature. However it has been found that the higher temperature blown asphalt will also go into solution upon heating of the combination to a flowing condition during processing to form a product as in extrusion. All three components appear to go into solution to effect an amalgamation of the polymers which in many instances would otherwise not be expected to join each other. In this respect it appears that the blown asphalt or mineral rubber acts like a fluxing agent to compatibilize or amalgamize the dissimilar polymers.

The different forms of polymers can be waste plastics of bottles or other containers which may even contain residual contaminants are first fragmented such as by tearing or grinding the materials to a convenient chip size of less than about ¼ inch. The chips then can be readied for processing such as by depositing them in dry form in the hopper of an extruder or injection mold machine along with granules of the blown asphalt intermixed therewith. The solids are softened and melted in the processing machine as they proceed from the hopper through the barrel of the processor to the product stage. In an extrusion operation the product die may be a sheet die to form a sheet of the amalgamated material. By adding a small amount of solid asphalt in granular form to waste plastics, with contaminants and all, the plastic can be heated to a evolution state in which they will readily commingle and amalgamate into a uniform plastic mass. The resulting amalgamation can be processed by conventional techniques into commercially desirable end products such as flower pots, plant trays, base panels for signs and numerous other products.

Waste plastics selected from accumulations in waste collection stations are usually segregated into at least two general predominant categories, one in which milk bottles and soft drink bottles are separated out as different classes from the waste plastics leaving the other plastic items of various compositions as the other class. The milk bottles as a class are almost universally made of low density polyethylene and the soft drink bottles of polyethylene teraphthalate (PET). These waste classes can each be processed with contaminants included to a solution according to the invention by the addition of 5–6% of blown asphalt granules. The remaining plastic items fall into the second category which includes plastics such as polypropylene, polystyrene, vinyls, acrylics, acrylo-nitrile butadiene styrene (ABS) nylon and styrene acrylo-nitrile found in waste such as waste car parts.

In the case of extrusion, other than directly extruding the materials directly into a desired product, the combination of materials can be first extruded or otherwise combined into the form of pellets, which pellets can be bagged and subsequently processed through an extruder or further processing in an injection molding machine to produce desired end products.

In its broadest sense, asphalt is utilized according to the concept of the present invention in an amount in the range of about ½% to 10% and preferably about 5%–7% by weight to act in a sense as a flux to combine or amalgamate or commingle dissimilar resins. It has been found that such combination can be effected with resins which previously would not combine structurally.

There are resins which will combine and others which will not. It has been perceived that those which will combine will do so with a weakness in that the combination will be in layered or stratified form and not truly be a completely commingled mass or amalgamation. Resins which are incompatible, for example, a combination of polystyrene and polyethylene, rather than commingling will form a stratified or layered combination when intermixed. By adding a small amount of asphalt, for example, in granular form, in an amount of about 5 to 7%, the dissimilar non-compatible materials combine into a unified homogeneous structure which does not give evidence of separate materials and behave like compatible polymers. Polyethylene, polyvinyl chloride, in combination with polystyrene can be combined into such an amalgamated mass by combination with blown asphalt.

It appears that the ratio of the non-compatible resins is not significant. It appears that any ratio and any number of the dissimilar resins can be amalgamated by use of a small quantity of the asphalt. Thus it serves ideally as a method of converting waste plastic materials collected by waste collection companies for the manufacture of useful products. The amalgamated resin can be used in extrusion, injection molding, calandering, blow molding or other conventional thermoplastic product production processes such as casting. For injection molding a high percentage of polyethylene is preferred.

As an extension of this concept, it is recognized that reinforcing elements can be incorporated in the amalgamated mass, such as glass fibers, carbon fibers in individual fiber form or in bundles, or woven or non-woven fabrics as reinforcement. In addition filler materials such as fly ash can be incorporated in the amalgamated mass with or without reinforcing elements. Further, many contaminants present with waste plastics are found to readily combine into the amalgamated mass.

In this respect the asphalt added to dissimilar polymers compatibilizes plastics which normally have little or no affinity for each other. The asphalt reduces the melt viscosity of the polymers and appears to act as a wetting agent for inorganic surfaces such as talc, fly ash, glass fibers, and the like. The addition of the small amount of asphalt also allows polymers to be molded at a lower processing temperature than is otherwise characteristic of the materials. The small addition of asphalt also improves the bonding of certain finishes in the form of paints on polymers which normally have poor bonding characteristics. The asphalt addition itself also can act as a filler or extender to thermoplastic resins serving to lower the cost of a composite.

Asphalt as a residue of petroleum oil refining, upon being blown with air, which at times is referred to as oxidizing of the asphalt, contains oil based constituents which because of its solid condition is capable of being added to a mixture of solid resins. A form other than a granular form it appears also can provide the fluxing properties found desirable. In this respect it is anticipated that flushing the solid plastics through an oil wash might provide a sufficient amount of such constituents as to effect the fluxing which will cause amalgamation of dissimilar resins.

In view of the foregoing it will be understood that many variations of the concept of the invention can be effected within a broad scope of principles embodied therein. Thus while particular embodiments of the invention have been shown and described, it is intended by the appended claims to cover all such modifications which fall within the true spirit and scope of the invention.

I claim:

1. A method of producing a formable material of dissimilar thermoplastic polymers comprising mixing fragments of said dissimilar thermoplastic polymers into a mixture, intermixing a small percentage by weight of particles of blown asphalt into a combination with said mixture, heating and working said combination into an amalgamation of said polymers, and further processing said amalgamation into products.

2. A method as set forth in claim 1 in which ½ to 10% of asphalt by weight of said combination is intermixed into said combination.

3. A method as set forth in claim 2 in which 5 to 6% of asphalt by weight of said combination is intermixed into said combination.

4. A method as set forth in claim 3 in which said blown asphalt in the form of granules are intermixed into said combination.

5. A method as set forth in claim 4 in which two dissimilar thermoplastic polymers are mixed into said mixture.

6. A method as set forth in claim 4 in which two dissimilar incompatible polymers are mixed into said mixture.

7. A method as set forth in claim 4 in which segregated waste polymers are mixed into said mixture.

8. A method as set forth in claim 4 in which said amalgamation is produced in an extruder as said material is being extruded into products.

9. A method as set forth in claim 8 in which said material is extruded into the form of pellets of said material for further processing.

10. A method as set forth in claim 4 in which said amalgamation is produced in an injection molding machine as said material is being formed into products by said machine.

11. A thermoplastic base material for processing into products comprising a combination of dissimilar thermoplastic polymers and a small percentage by weight of asphalt, said base material being an amalgamation of said combination formed by heating and working said combination into a solution and cooling the solution during processing into products.

12. A thermoplastic material as set forth in claim 11 in which the asphalt percentage by weight of said combination is in the range of ½ to 10%.

13. A material as set forth in claim 12 in which asphalt amounts to about 5 to 6 percent by weight of said combination.

14. A material as set forth in claim 13 in which two dissimilar thermoplastic resins are incorporated in said mixture.

15. A material as set forth in claim 13 in which said mixture incorporates two dissimilar incompatible resins.

16. A material as set forth in claim 13 in which said dissimilar polymers comprise segregated waste polymers.

17. A material as set forth in claim 11 in which said amalgamation is produced in an extruder as said material is being extruded into products.

* * * * *

UNITED STATES PATENT AND TRADEMARK OFFICE
CERTIFICATE OF CORRECTION

PATENT NO. : 5,567,364
DATED : October 22, 1996
INVENTOR(S) : Thomas E. Philipps It is certified that error appears in the above-identified patent and that said Letters Patent is hereby corrected as shown below:

On the title page: [73] Assignee's should read
Assignee: ISORCA, Inc.

Signed and Sealed this

Fourth Day of March, 1997

Attest:

BRUCE LEHMAN

Attesting Officer

Commissioner of Patents and Trademarks